Figure 1:
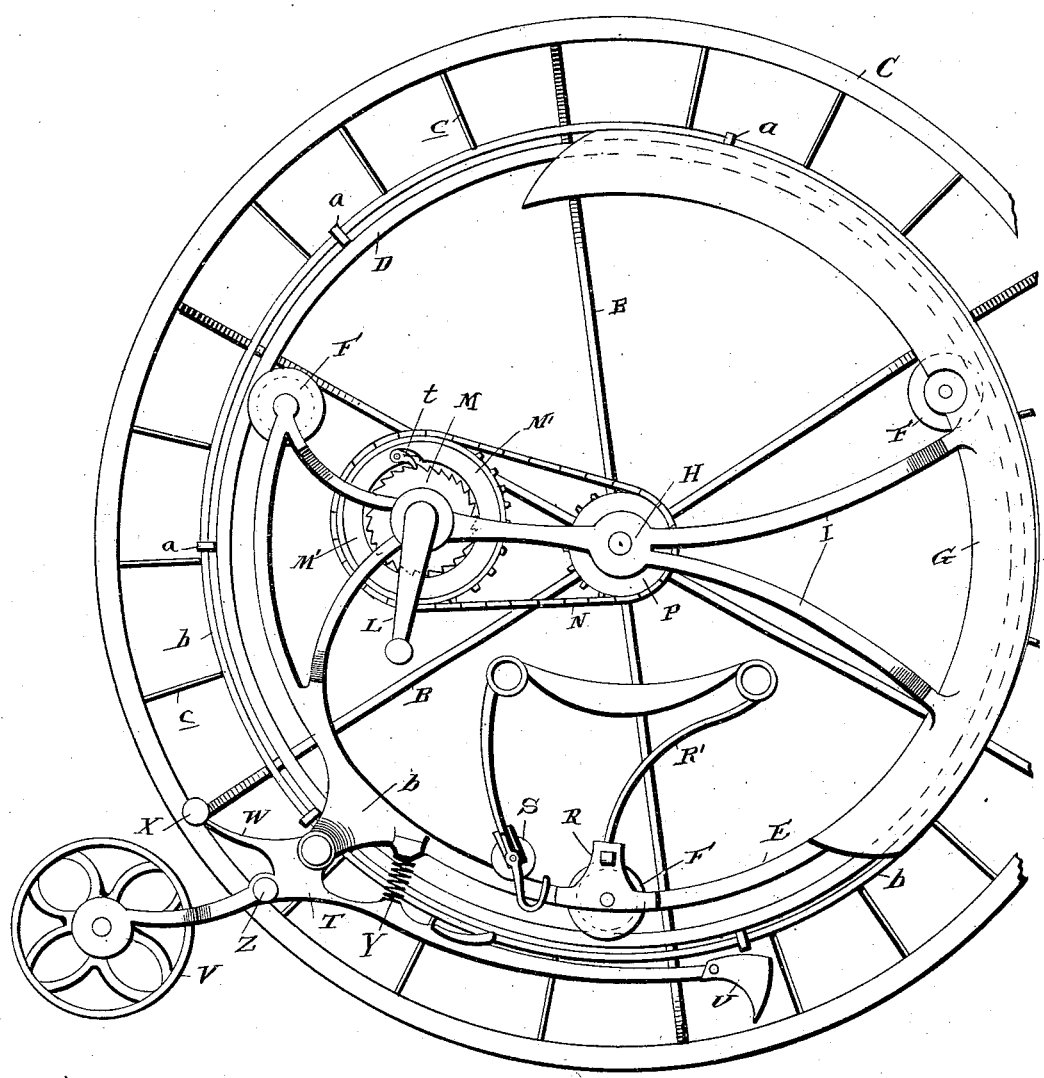

(No Model.)

2 Sheets—Sheet 1.

J. D. MATTISON.
ONE WHEELED CYCLE.

No. 475,130. Patented May 17, 1892.

Witnesses:
C. H. Rueder
Thomas E. Turpin

Inventor
James D. Mattison
By James Sheehy
Attorney

THE NORRIS PETERS CO., PHOTO-LITHO., WASHINGTON, D. C.

(No Model.) 2 Sheets—Sheet 2.
J. D. MATTISON.
ONE WHEELED CYCLE.
No. 475,130. Patented May 17, 1892.
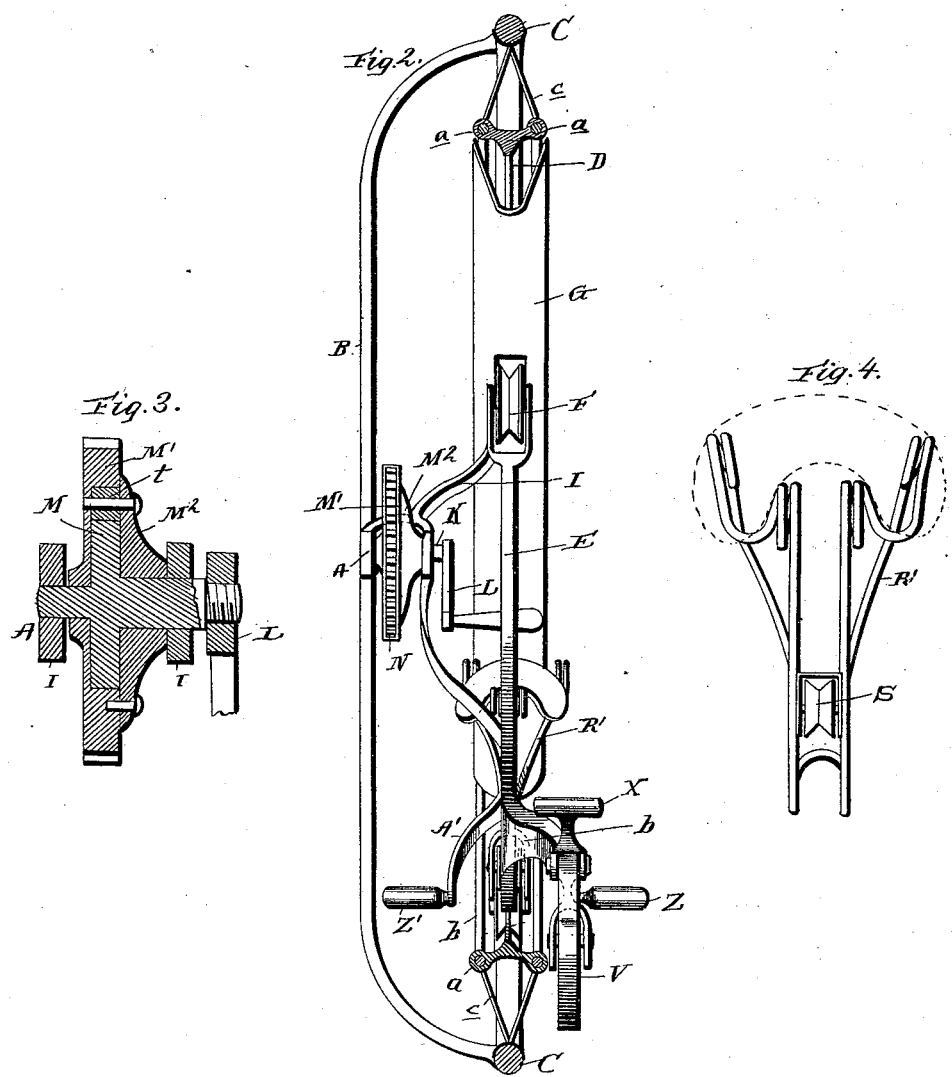
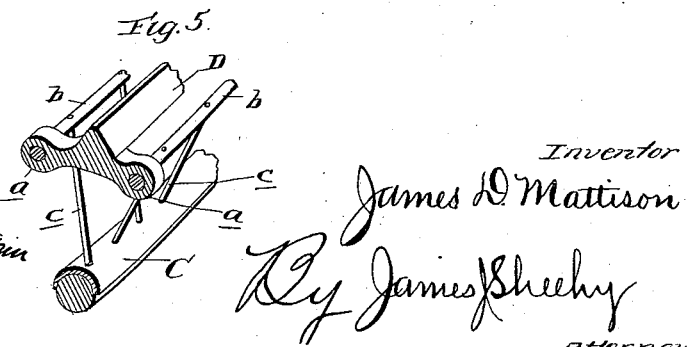

UNITED STATES PATENT OFFICE.

JAMES D. MATTISON, OF SAGINAW, MICHIGAN.

ONE-WHEELED CYCLE.

SPECIFICATION forming part of Letters Patent No. 475,130, dated May 17, 1892.

Application filed August 6, 1891. Serial No. 401,855. (No model.)

*To all whom it may concern:*

Be it known that I, JAMES D. MATTISON, a citizen of the United States, residing at Saginaw, in the county of Saginaw and State of Michigan, have invented certain new and useful Improvements in One-Wheeled Cycles; and I do declare the following to be a full, clear, and exact description of the invention, such as will enable others skilled in the art to which it appertains to make and use the same.

My invention has relation to that class of velocipedes known as "monocycles;" and its novelty will be fully understood from the following description and claims, when taken in conjunction with the accompanying drawings, in which—

Figure 1 is a side elevation of my improved monocycle. Fig. 2 is a front end elevation of the same. Fig. 3 is a detail view of the drive-gearing. Fig. 4 is a front elevation of the saddle-frame removed; and Fig. 5 is a detail perspective view of a portion of the wheel, illustrating the tire, the inner rim, and the manner in which the same are connected.

Referring by letter to said drawings, A indicates the hub of the traveling wheel of my improved cycle, from which radiate the spokes B, which may be formed integral with the hub or connected thereto in the ordinary or any approved manner.

As better illustrated in Fig. 2 of the drawings, the spokes B of the wheel are curved laterally adjacent their outer ends, whereby the tire C, to which they are suitably connected, will occupy a lateral vertical plane with respect to the plane of the hub, so that the supporting-frame of the seat and drive-gearing may rest within the wheel without interfering with the spokes thereof.

D indicates the inner circular rim of the wheel, which is provided at intervals in its length with lateral ears or branches $a$, through which take circular rods $b$, to which are connected one end of the short spokes $c$, which are connected at their opposite end to the tire. These short spokes $c$, which serve to connect the inner circular rim and the tire and to brace and strengthen the wheel, are preferably connected to the tire and to the respective ears of the circular rim alternately, as illustrated, whereby greater strength is attained.

E indicates the semicircular or curvilinear bar of the carriage-frame, which is provided adjacent its middle and its respective ends with suitable bearings for the friction-wheels F, which bear upon the inner edge of the circular rim D, as illustrated, and preferably have their peripheries grooved, whereby they are prevented from casual lateral displacement.

Suitably connected to the rear portion of the curvilinear bar E is a mud-guard G, which is preferably of a trough-shape in cross-section and straddles the inner circular rim of the wheel, whereby the rider will be protected from the dirt thrown by the wheel.

H indicates the central portion or hub of the carriage-frame, which is mounted upon a lug or the like extending from the hub of the wheel in any approved manner. This central portion or hub H is connected to the curvilinear bar E of the frame by the radial curved branches I, which, if desirable, may be cast or otherwise formed integral with the hub and the curvilinear bar.

Journaled in suitable bearings formed in the forward branch I of the carriage-frame is a crank-shaft K, which is provided at its inner end with a crank arm and handle L, whereby the shaft may be readily rotated. Suitably fixed upon or formed integral with the shaft K is a ratchet-wheel M, which rests in a recess in one side of a sprocket-gear M', which turns loosely upon the shaft and is prevented from lateral play therein by a disk $M^2$, which serves in addition as a keeper for the ratchet-wheel. Pivotally connected to the sprocket-gear M' and resting in a recess therein in alignment with the toothed periphery of the ratchet wheel is a spring-backed pawl $t$, which is normally engaged by the teeth of the ratchet, whereby when the crank and the ratchet-wheel are rotated the sprocket-gear will also be rotated. By this construction it will also be seen that the sprocket-gear may rotate in a forward direction independent of the ratchet-wheel, as the pawl will ride over the teeth of the ratchet.

The sprocket-gear M' is connected by a suitable chain belt N with a preferably smaller sprocket-gear P, which is preferably formed integral with the hub of the traveling wheel, although in some cases it may be formed separate from the hub and be suitably connected thereto. Thus it will be seen that when the crank-shaft K is rotated motion will be imparted to the traveling wheel.

Preferably formed integral with the curvilinear bar E of the carriage-frame at a suitable point is a seat or socket R for the ends of the wire forming the saddle-frame R'. This saddle-frame R', which is formed from a single piece of wire, has its ends seated in the socket R, as before described, and the looped forward portion of the saddle is bent upwardly as illustrated, whereby it will straddle the curvilinear bar E and prevent the friction-wheel S, which is journaled between its branches and bears upon said curvilinear bar, from casual displacement.

As better illustrated in Fig. 4 of the drawings, the wire comprising the saddle-frame is provided with suitable rear and forward spring-coils upon which the saddle-leather rests.

By having the forward portion of the saddle-frame rest loosely upon the curvilinear bar of the carriage-frame it will be readily seen that the same will give slightly under pressure, which renders the same more easy and comfortable.

Preferably formed integral with the curvilinear bar E, in advance of the saddle thereon, is a forwardly-disposed laterally-curved branch b, to which is pivotally connected a lever T, which is provided at its rear end with a drag U, designed and adapted to engage the ground and serve to stop the wheel or reduce the speed thereof when desired. Suitably journaled on a transverse shaft at the forward end of the lever T is a safety-wheel V, which is designed to prevent the seat-supporting frame from pitching forwardly while the cycle is descending a hill or steep grade. Formed integral with the lever T and extending upwardly and forwardly therefrom in advance of its pivotal connection is a branch W, which is provided at its end with a transverse pedal branch X, to receive the foot of the rider when it is desired to hold the safety-wheel to the ground. At the rear of the pivoted connection of the lever T a coiled spring Y is interposed between said lever and the bar E, which spring serves to hold both the safety-wheel and drag away from the ground, which is their normal position. Formed integral with or suitably connected to the lever T and extending laterally therefrom in advance of the pivotal connection of said lever is a foot-rest Z, and connected at a suitable point to the inside of the lever T is a forwardly-extending curved branch A', which is provided at its forward end with an inwardly-directed lateral branch Z', whereby it will be readily perceived that when in position the rider will straddle the curvilinear bar E and be enabled to easily balance the machine.

In the practice of my invention I do not desire to be confined to the employment of a drag upon the rear end of the lever T, as in some instances a friction-wheel is employed instead of a drag.

By the peculiar construction described it will be readily perceived that the seat-supporting frame, being hung from the axle of the wheel and bearing upon the inner rim thereof, will always occupy the position illustrated in Fig. 1.

To mount the machine, the rider holds the same in an upright position and steps upon the rear portion of the lever T, which forces the drag to engage the ground, whereby the machine is held in its upright position. The rider holds his foot upon the rear portion of the lever, as described, until he starts the machine by turning the crank L, when he moves his foot from the lever and places the same upon one of the foot-rests described.

Having described my invention, what I claim, and desire to secure by Letters Patent, is—

1. In a monocycle, the combination, with the curvilinear bar of the carriage-frame, of the saddle-frame fixedly connected at one end to the said curvilinear bar and carrying a friction-wheel at its opposite end adapted to bear and play upon the curvilinear bar, substantially as and for the purpose specified.

2. In a monocycle, substantially as described, the combination, with the traveling wheel, of the seat and gearing supporting frame hung from the hub of the wheel and bearing upon the inner rim of the wheel, the lever pivotally connected to the curvilinear bar of the supporting-frame and carrying a wheel at its forward end and a drag device at its rear end, and a coiled spring interposed between the rear portion of the lever and the curvilinear bar of the frame, all substantially as specified.

3. In a monocycle, the combination, with the traveling wheel comprising the hub, the radial spokes connected to the hub and having their outer portions curved laterally, the tire connected to the outer ends of the spokes, the inner circular rim of a less diameter than the tire and connected thereto, and the sprocket-pinion fixed on the hub of the wheel, of the carriage-frame comprising the hub connected to the hub of the wheel, the radial bars and the curvilinear bar connected to the outer ends of the radial bars and carrying friction-wheels adapted to bear upon the inner circular rim of the wheel, a transverse shaft-bearing in the forward radial bar of the frame and carrying a crank-arm at one end, a sprocket-gear fixed on said shaft, and a chain belt connecting the sprocket-gear of the shaft and the pinion on the axle, substantially as and for the purpose specified.

In testimony whereof I affix my signature in presence of two witnesses.

JAMES D. MATTISON.

Witnesses:
W. L. REED,
E. J. HASKIN.